United States Patent [19]
Reshef et al.

[11] Patent Number: 5,094,520
[45] Date of Patent: Mar. 10, 1992

[54] GOGGLES' LENSES

[75] Inventors: Yaron Reshef, Natanya; Uri Alon, Hasharon, both of Israel

[73] Assignee: Bezalel Research and Development Ltd., Israel

[21] Appl. No.: 660,121

[22] Filed: Feb. 22, 1991

[30] Foreign Application Priority Data

Feb. 27, 1990 [IL] Israel .................................... 93557

[51] Int. Cl.$^5$ .......................... G02C 7/02; G02B 13/18
[52] U.S. Cl. ..................................... 351/159; 351/43; 359/720
[58] Field of Search ................................ 351/159, 43; 350/432–435, 436; 359/720

[56] References Cited

U.S. PATENT DOCUMENTS

| | | | |
|---|---|---|---|
| 3,040,616 | 6/1962 | Simpson | 351/43 X |
| 3,672,750 | 6/1972 | Hagen | 351/43 |
| 3,899,244 | 8/1975 | Mulder | 351/43 |

Primary Examiner—Scott J. Sugarman
Attorney, Agent, or Firm—Howard L. Rose

[57] ABSTRACT

An axiosymmetric eccentric spherical polycarbonate lens (2) for goggles (1), comprising inner (7) and outer (8) spherical surfaces defined by centers of curvature $O_1$ and $O_2$ and by radii $R_1$ and $R_2$, respectively, $O_1$ and $O_2$ being both located on the lens's axis of symmetry (5), at a distance D from each other, the lens being more distal from $O_1$ than from $O_2$, the length of $R_2$ being about 1.025–1.035 $R_1$, and that of D about 0.0510–0.0564.

6 Claims, 4 Drawing Sheets

GOGGLES' LENSES

FIELD AND BACKGROUND OF THE INVENTION

The present invention generally concerns goggles which are a protective glasses set usually in a flexible frame that fits snugly around the wearer's eyes' thus protecting the eyes against airborne gases and particles.

Goggles generally comprise an optical surface, designed to transmit images with minimal optical aberrations. This optical surface (hereinafter to be referred to by the term "lens") may be made of glass or various transparent plastic materials such as polycarbonate. Polycarbonate which has characteristically a high mechanical strength is usually the preferred substance for use in such lenses.

Goggles' lenses, unless designed for a specific individual, should be optically neutral, i.e. they should cause no or only very little aberrations of the transmitted image. In general, optical aberrations by lenses may be caused either by an incorrect placement of the lens in front of the eye or by inherent properties of the lens itself. To date, only plannar lenses are known to be immune of these two types of optical abberations and therefore all goggles which were hitherto available had such lenses, known also as "window lenses". A major drawback of such lenses is the fact that the field of vision through them is limited. This drawback considerably limits the applicability of goggles.

Against this, spherical lenses have a large field of vision, sometimes almost as large as the naked eye. However, all spherical lenses used to date cause considerable optical aberrations of the transmitted optical image. One source of these aberrations is intrinsic in that the dioptric of a spherical lens is relatively high, and results from the fact that such lenses have, as a rule, a relatively short focal length. For example, a concentric lens (a spherical lens in which the two surfaces have a common centre of curvature) made of polypropylene having standard design parameters such as a thickness of around 2 mm and a radius of the inner surface of about 25-30 mm, has a focal length of about 1 meter, i.e. a power of about 1 diopter. Another source of the optical abberation in such lenses results from placement errors, namely incorrect placement of the lens with respect to the eye: where the exit pupil, i.e. the eye, is located outside the lens's axis of symmetry, the optical aberrations of the transmitted image increase considerably. Since placement errors are practically unavoidable seeing that the inter-eye distance and the position of the eye with respect to the eyes' orbit, vary considerably to a very big extent between different individuals, aberrations due to placement errors are bound to occur in goggles with spherical lenses which is a serious drawback.

Some of the optical aberrations caused by spherical lenses may at times be corrected by tailor-making the lens to a specific individual.

It is the object of the present invention to provide spherical lenses for goggles suitable for use by all individuals, which transmit the optical image with little aberrations.

GENERAL DESCRIPTION OF THE INVENTION

In accordance with the invention there is provided an axiosymmetric eccentric spherical polycarbonate lens for goggles, comprising inner and outer spherical surfaces defined by centers of curvature $O_1$ and $O_2$ and by radii $R_1$ and $R_2$, respectively, $O_1$ and $O_2$ both being located on the lens's axis of symmetry, at a distance D from each other, the lens being more distal from $O_1$ than from $O_2$, the length $R_2$ being about 1.025-1.035, preferably about 1.03 $R_1$, and D is about 0.0510-0.0564, preferably about 0.0537 $R_1$.

The present invention also provides goggles fitted with lenses of the kind specified.

Lenses in accordance with the invention are essentially optically neutral, namely they transmit the image with very little optical aberrations. Furthermore, these lenses are not sensitive to placement errors, and the transmitted optical image will be essentially free of abberations even if the eye is not located on the lens's axis of symmetry.

BRIEF DESCRIPTION OF THE DRAWINGS

For better understanding, the invention will now be described, by way of example only, with reference to the annexed drawings in which.

DETAILED DESCRIPTION OF THE INVENTION

Figure 1:
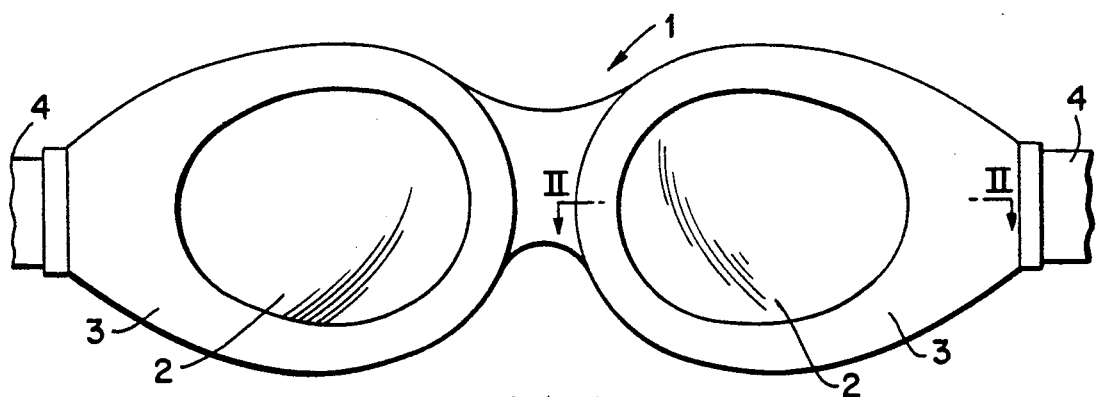
FIG. 1 is a frontal view of goggles in accordance with the invention.
Figure 2:
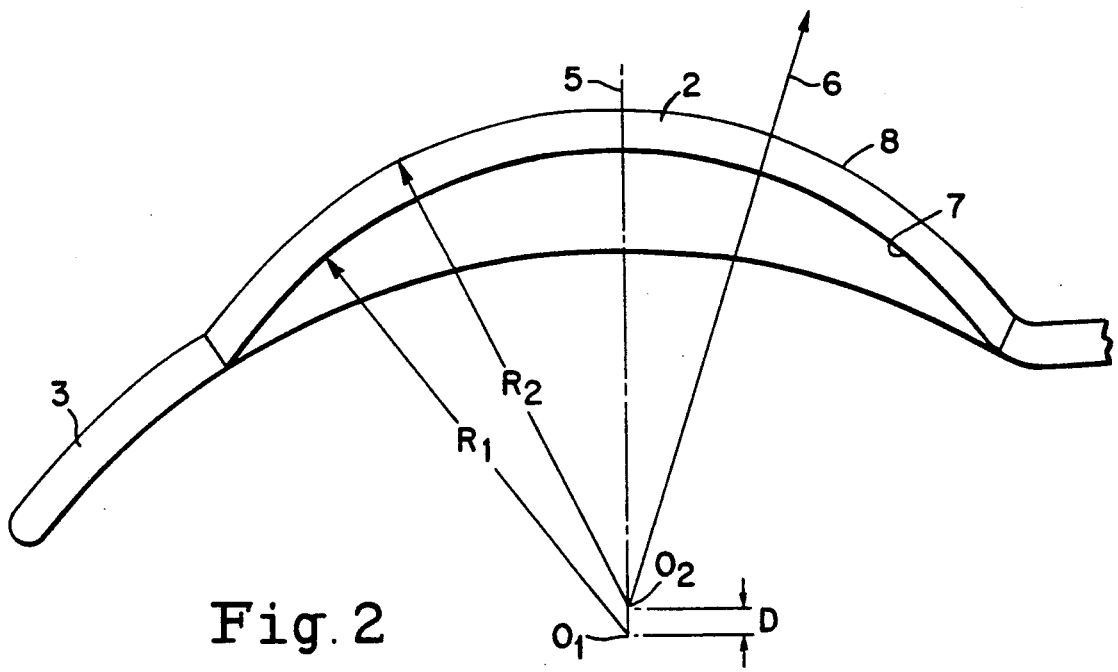
FIG. 2 is a section along the line II—II in FIG. 1.

The goggles 1 shown in FIGS. 1 and 2 comprise polycarbonate spherical lenses 2 a frame 3 and fastening straps 4. As shown in FIG. 2 the lens's axis of symmetry 5, for the left eye, is tilted by about 18.5° from the line of sight to the forward direction 6.

The curvature of the internal surface 7 and the external surface 8 of the lens are respectively defined by centres of curvature $O_1$ and $O_2$ and associated radii $R_1$ and $R_2$. $O_1$ and $O_2$ lie both on the axis of symmetry 5, $O_2$ being closer to the lens than $O_1$ and separated therefrom by a distance D. In the specific embodiment shown in FIGS. 1 and 2 $R_1$ measures about 24.13 mm, $R_2$ measures about 24.87 mm and D measures about 1.295 mm. In terms of the definitions herein $R_2$ and D are thus about 1.0307 $R_1$ and about 0.0537 $R_1$, respectively.

Figure 4:
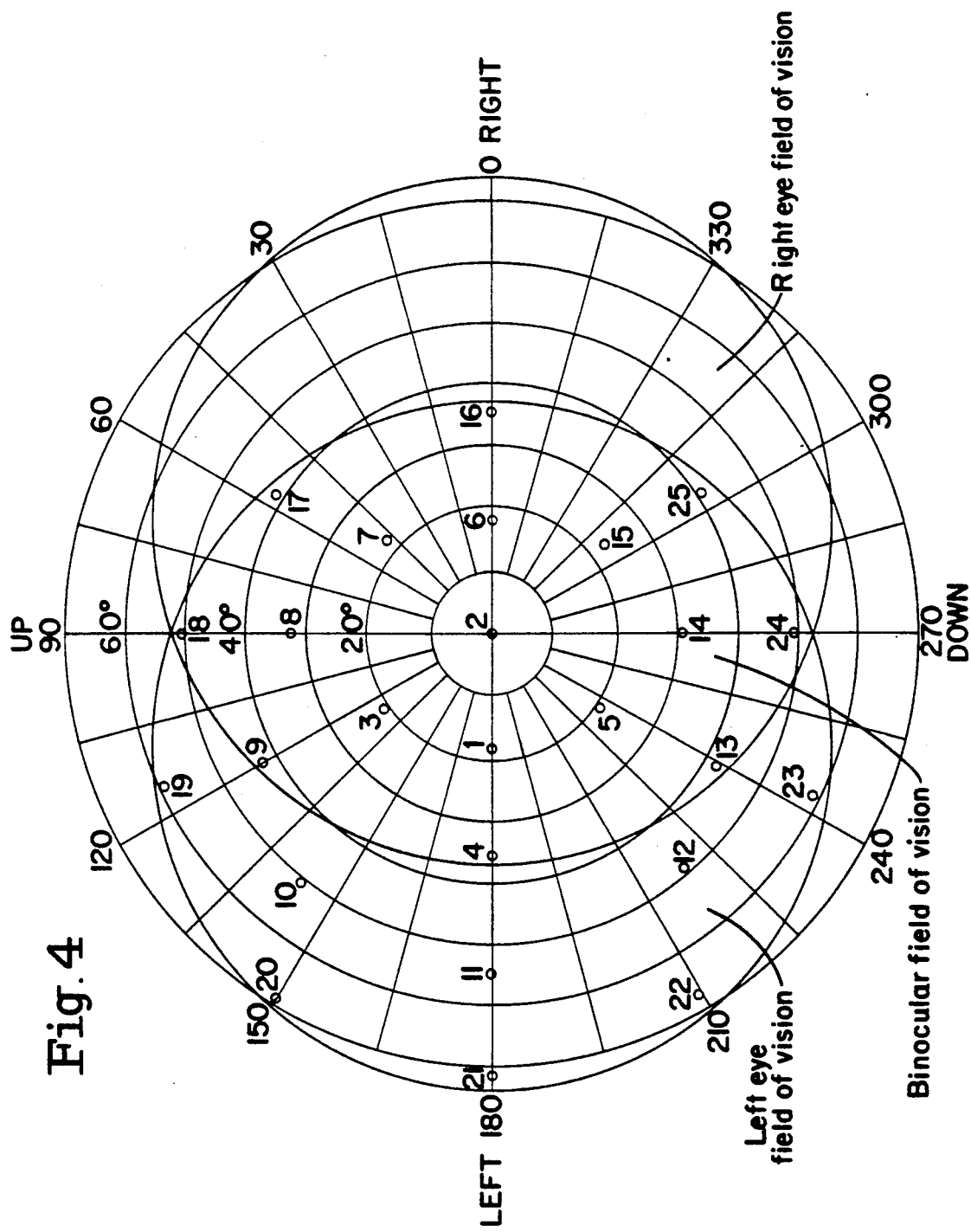
FIG. 4 shows the monocular field of vision of each lens, as well as the combined binocular field of vision, with points in the left eye's field of vision which were sampled by computer simulation to determine the lens's optical properties.

As can be seen from FIG. 2, the lenses 2 each have a spherical geometry which provides the viewer with a very wide field of vision of about 112° for each eye, which is almost as wide as the field of vision of the naked eye. As can be seen in FIG. 4, there is also a considerable binocular overlap between the lenses of about 75° and a total binocular field of vision of about 149°.

The size of a lens according to the invention is not critical and will depend on practical considerations, always provided that the above defined relationships between $R_1$, $R_2$ and D are maintained. From a practical point of view $R_1$ should not be too small, e.g. not less than about 22 mm and preferably 24 mm, so as to ensure that the lens does not hamper the movement of the eyelashes.

Figure 3:
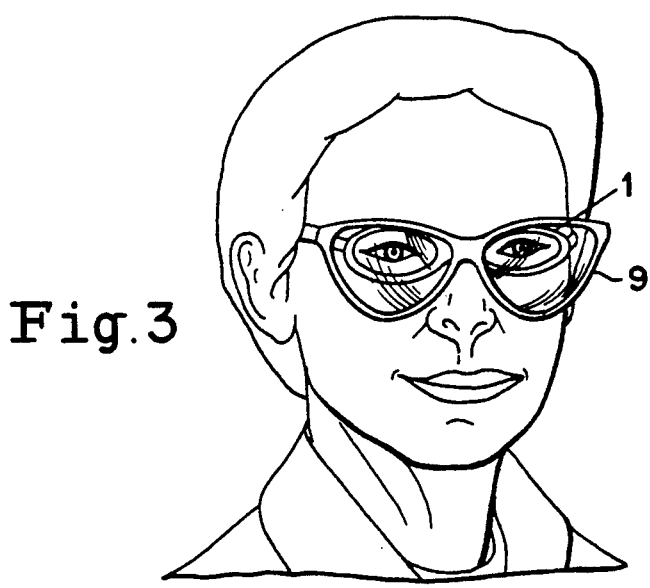
FIG. 3 shows an individual wearing both goggles in accordance with the invention and spectacles.

On the other hand, the size of the lens should not be too large so as not to render the lens too bulky. In addition, a small lens has the advantage that people with distorted eyesight may continue using their spectacles while wearing the goggles as shown in FIG. 3 which depicts an individual wearing both goggles 1 and spectacles 9 on top. This obviously is not possible with large lenses. From such practical considerations $R_1$ is preferably lower than 35 mm and most preferably lower than 30 mm.

As will be further shown below, the lenses in accordance with the present invention have a very low power and an insignificant astigmatic value. The image transmitted by these lenses is sharp and is in fact limited only by limits imposed by light diffraction, over the entire field of vision. Furthermore, the optical performance of these lenses are almost not affected by placement errors.

The optical properties of the lenses according to the invention, although slightly short of those of planar lenses, are far superior to those of concentric lenses. At the present time, however, the lenses according to the invention have a much wider field of vision than planar lenses and a goggles' lens that combines a near-aberration free light transmission with a wide field of vision has never been known before.

As known in the art, the lens may either be integral with the frame or fitted into a frame by any of a number of means known per se. The frame may be made of the same or of a different material than the lens. Also, as known, where the frame is made of a rigid material, it will usually comprise a flexible rim portion.

EXPERIMENTAL RESULTS

The optical performance of the lens shown in FIG. 1 and 2 was tested by a computer simulation using a ray tracing program known per se.

The lens was tested in accordance with the following parameters:

The exit pupil was fixed at a surface normal to the line of site 5 in FIG. 1, at a distance of 24.13 mm from the inner surface of the lens. The aperture of the exit pupil was determined to be 15 mm in diameter, symmetrically around the line of sight. The size of the exit pupil is consistent with the antropometric distribution of the inter eye distance within the population. The aperture of the eye's iris was chosen to be 4.0 mm which is an average value between the aperture in high brightness (2.0 mm) and low brightness (6.0 mm).

The simulated lens had an $R_1$ of 24.13 mm, $R_2$ of 24.8666 mm and D of 1.2954 mm (in accordance with these parameters the thickness of the lens at the axis of symmetry is 2.032 mm).

All tests were made using a simmulated wavelength of 555 nm, in which the refractive index of polycarbonate is 1.58906 and the dispersion constant 34.70.

Several points in the field of the left lens were sampled and these are shown in FIG. 4. Point 1 is on the axis of symmetry of the lens, points 2-5 are around the axis of symmetry at a field angle of 18.5°, points 6-15 are more peripheral and are at a field angle of 37° while points 16-25 are on the periphery of the field of vision of the left lens and at a field angle of 53° relative to the axis of symmetry.

Test No. 1

The lens was found to behave as a positive lens having a focal length of about 61 meters for both tangentially and sagitally distributed lens bundles.

The tangential and sagital power ($\phi_T$ and $\phi_S$, respectively) were measured by directing tangential and sagital rays bundles using the Coddington equations known per se. The results obtained for 15 different sampled points of FIG. 4 are shown in the following Table I.

TABLE I

| FIELD POINTS | $\phi_T$ | $\phi_T$ | $\phi_{AST}$ | $\bar{\phi}$ |
|---|---|---|---|---|
| 1 | +0.0163 | +0.0163 | 0.0 | +0.0163 |
| 2-5 | +0.0026 | −0.0038 | 0.0064 | −0.0006 |
| 6-15 | −0.0389 | −0.0622 | 0.0233 | −0.0506 |

$\phi_{AST}$ - the astigmatic dioptri ($\phi_{AST} = \phi_T - \phi_S$); $\bar{\phi}$ - the power diopter. ($\bar{\phi} = \frac{1}{2}(\phi_T + \phi_S)$).

It may be seen from the above results that the optical aberrations over the entire field of view are small.

These results were compared to those obtained with a concentric polycarbonate lens (a lens having two spherical surfaces and having a mutual center of curvature), having very similar dimensions, namely $R_1 = 24.13$ mm and $R_2 = 26.162$ mm (the lens thickness being therefor 2.032 mm). The power of such a lens was found to be −1.193 diopter, namely the focal length of each eye separately would be −0.84M, over the entire field of vision.

Test No. 2

Figure 5:
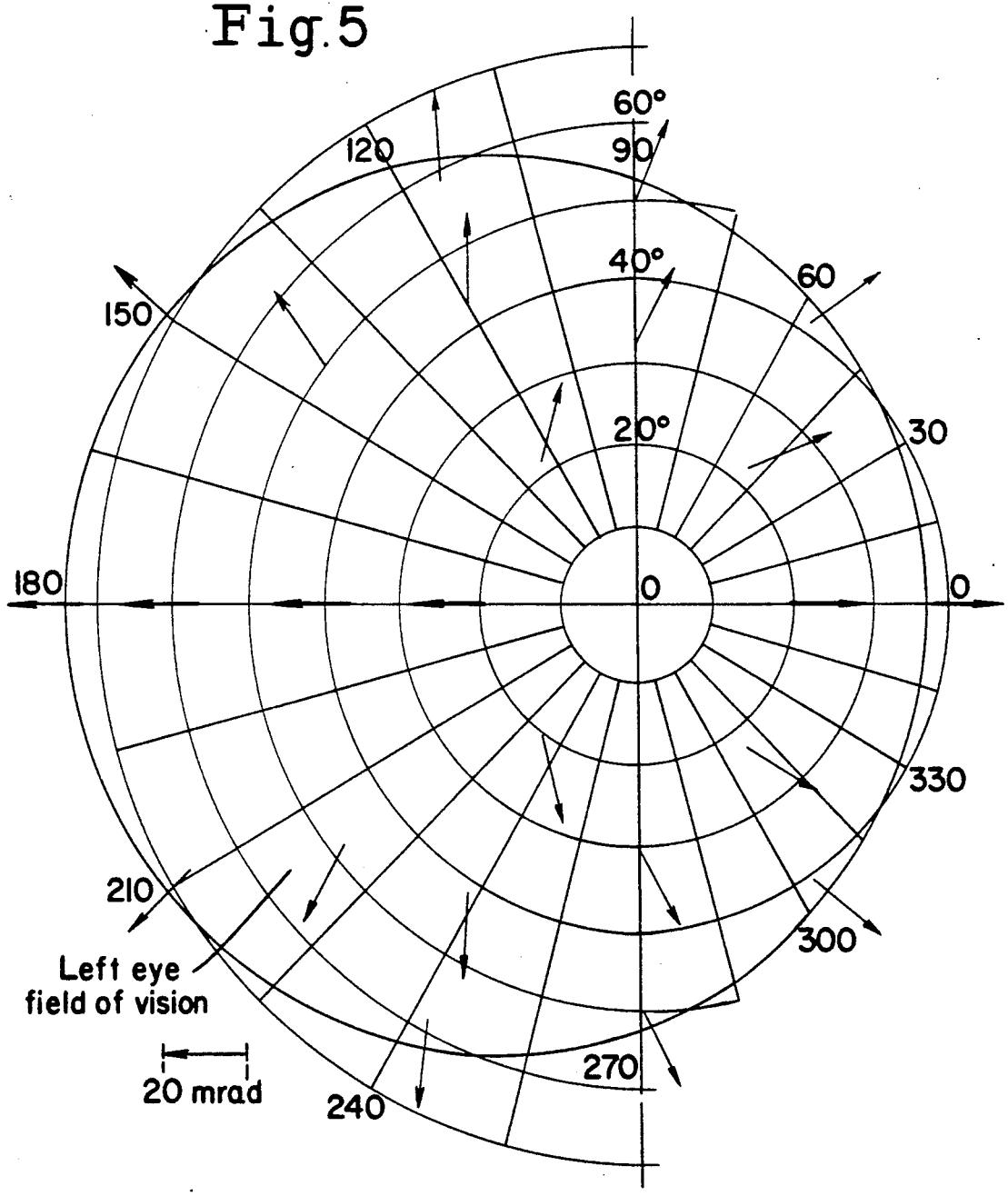
FIG. 5 shows the prismatic aberrations of the left lens (the arrow at the left bottom corner gives the scale and is equal to an aberration of 20 mrad.)
Figure 7:
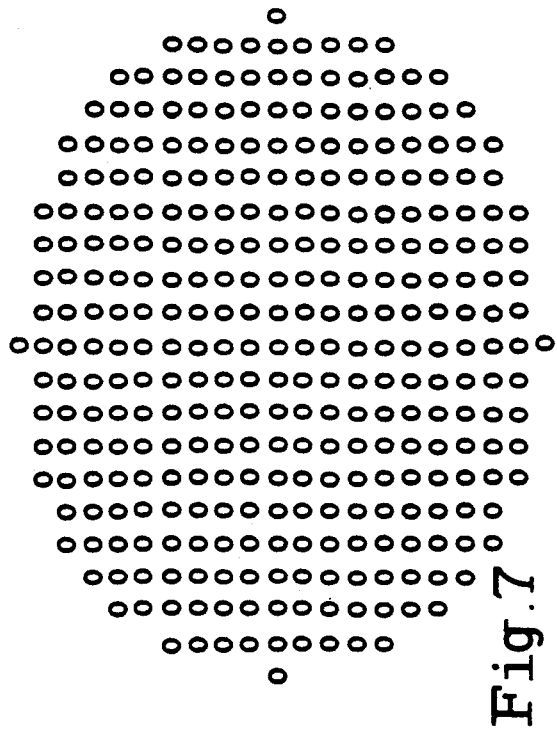
FIGS. 6-9 depict the degree of wave aberrations, at a wavelength $\lambda = 555$ nm, over an exit pupil of 4.0 mm in various field angles with respect to the lenses axis of symmetry: 0°—FIG. 6; 18.5°—FIG. 7; 37°—FIG. 8; and 53°—FIG. 9. An aberration of up to $\lambda/8$ was given a value of "0", an aberration of $\lambda/8-3\lambda/8$ value of 1 and an aberration of $3\lambda/8-5\lambda/8$ value of 2.
Figure 9:
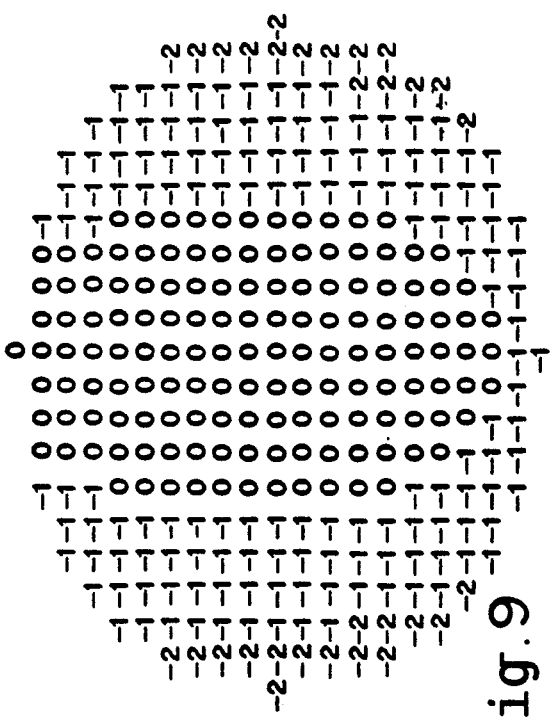
Figure 6:
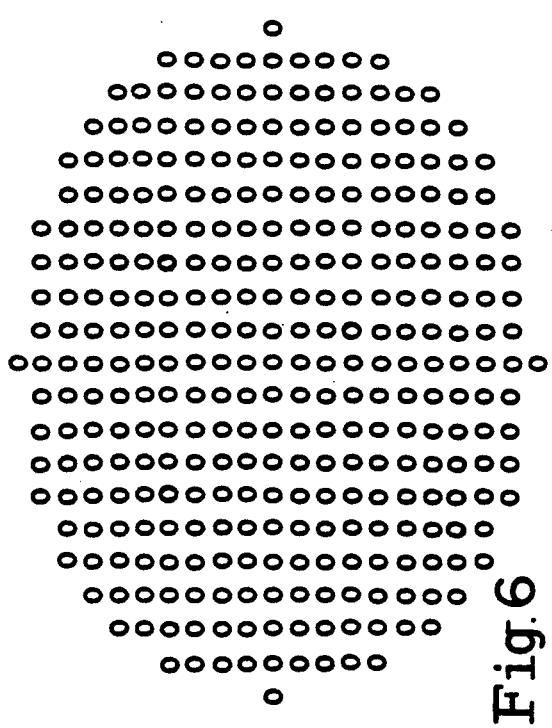
Figure 8:
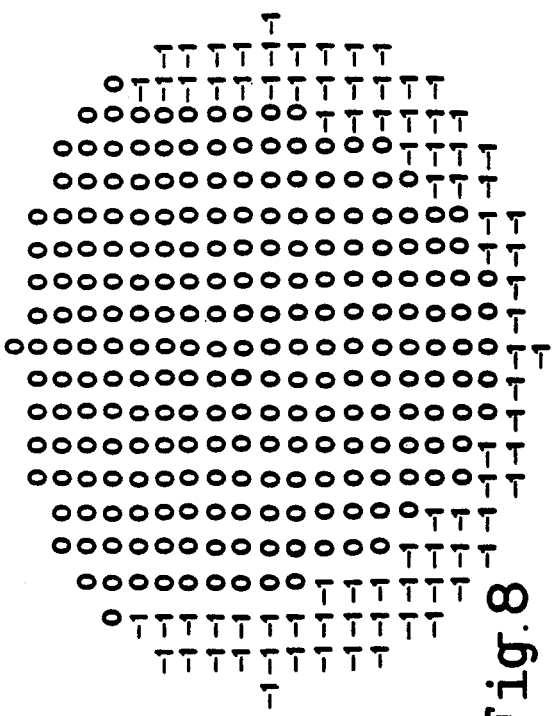

The prismatic aberration of the lens was measured and the results are shown in FIG. 5. In this figure each arrow represents the direction and size of the prismatic aberration, for example a far away object in the line of sight will be seen in the left eye deflected by 9.738 mrad. (0.558°) towards the right from its real direction.

Test No. 3

In order to demonstrate the lens's lack of sensitivity to placement error, the exit pupil was placed laterally at a distance of 7.5 mm around its nominal point on the axis of symmetry. The prismatic aberrations are shown in the following Table II (the results are in mrad. and show the additional prismatic aberration beyond the prismatic aberration which occurs in proper placement):

TABLE II

| | Field angle from the lenses axis of symmetry | | | |
|---|---|---|---|---|
| DISPLACEMENT OF THE EYE FROM EXIT PUPIL CENTER | 0° | 18.5° | 37° | 53° |
| right | +7.5 | −0.260 | −0.9886 | −0.9290 | −0.3571 |
| left | −7.5 | +0.260 | −0.7377 | +1.3247 | +0.2849 |
| top | +7.5 | +0.260 | +0.3114 | +0.5869 | +0.7703 |
| bottom | −7.5 | −0.260 | −0.3114 | −0.5869 | −0.7703 |

In comparison it should be noted that in a concentric lens the additional prismatic aberration resulting from such an improper placement is 9.828 mrad. over the entire field of vision.

Test No. 4

Tests to determine the image quality were made by analysing a plannar wave front passing through the lens in various field angles. The wave aberrations were measured on an aperture of 4.0 mm, which represents the aperture of the eye in average conditions.

The test was performed with a wavelength $\lambda = 555$ nm, in accordance with the Reighlish criteria, an aberration of $\lambda/4$ does not reduce the image quality and therefore this value was used as the reference value. An aberration below $\lambda/8$ (half of the reference value) was regarded as "0", an aberration of $\lambda/8-3\lambda/8$ as "1", an aberration of $3\lambda/8-5\lambda/8$ as "2".

Simulations were made at 0°—at the axis of symmetry, which corresponds to field point number 1 in FIG. 4, at a field angle of 18.5° from the center of symmetry which corresponds to points 2-5, at a field angle of 37° which corresponds to points 6-15 and at a field angle of 53° which corresponds to points 16-26 in FIG. 4.

The results are shown in FIGS. 6-9 for field angles 0°, 18.5°, 37° and 53°, respectively.

As can be seen, only at a field angle of 53°, the wave aberrations reached a value of "2" at the periphery of the exit pupil. However, since this value is lower than the diffraction limits it may be concluded that the image quality over the entire field of vision will in fact be limited only by the limits imposed by diffraction.

Test No. 5

The lenses were scaled up by a factor of 1.2, namely all measures were increased by 20%. All the above tests were repeated and similar or at times even better optical performance of the lens was obtained.

We claim:

1. An axiosymmetric eccentric spherical polycarbonate lens for goggles, comprising inner and outer spherical surfaces defined by centers of curvature $O_1$ and $O_2$ and by radii $R_1$ and $R_2$, respectively, $O_1$ and $O_2$ being both located on the lens's axis of symmetry, at a distance D from each other, the lens being more distal from $O_1$ than from $O_2$, the length of $R_2$ being about 1.025-1.035 $R_1$, and that of D about 0.0510-0.0564.

2. A lens according to claim 1 wherein $R_2$ is about 1.03 $R_1$.

3. A lens according to claim 1 wherein D is about 0.0537 $R_1$.

4. A lens according to claim 1, wherein the length of $R_1$ is about 22-35 mm.

5. A lens according to claim 1, wherein the length of $R_1$ is about 24-30 mm.

6. Goggles having an axiosymmetric eccentric spherical polycarbonate lens, comprising inner and outer spherical surfaces defined by centers of curvature $O_1$ and $O_2$ and by radii $R_1$ and $R_2$, respectively, $O_1$ and $O_2$ being both located on the lens's axis of symmetry, at a distance D from each other, the lens being more distal from $O_1$ than from $O_2$, the length of $R_2$ being about 1.025-1.035 $R_1$, and that of D about 0.0510-0.0564.

* * * * *